United States Patent Office 3,271,468
Patented Sept. 6, 1966

3,271,468
PROCESS FOR THE CATALYTIC CO-OLIGOM-
ERIZATION OF DIOLEFINS
Günther Wilke and Paul Heimbach, Mulheim (Ruhr),
Germany, assignors to Studiengesellschaft Kohle m.b.H.,
Mulheim (Ruhr), Germany
No Drawing. Filed Mar. 22, 1963, Ser. No. 267,364
Claims priority, application Germany, Mar. 26, 1962,
St 19,911
19 Claims. (Cl. 260—668)

This invention relates to a process for the catalytic co-oligomerization of diolefins.

Austrian Patents 202,933, 210,402, 211,810 and 219,580 and Belgian Patent 619,490 disclose processes for the production of cyclic olefins, particularly of cyclododecatri-(1,5,9)-enes and cyclooctadi-(1,5)-enes from 1,3-diolefins. In these processes, organometallic complexes of transition metals of sub-group VIII of the Periodic Table are used as catalysts. Carbon monoxide-free complex compounds of nickel have been found to be particularly effective catalysts.

It has now been found surprisingly that it is not only possible to subject 1,3-diolefins as such to this catalytic oligomerization but that it is also possible to react mixtures of such 1,3-diolefins with ethylene, butyne-(2) and/or styrene to form oligomeric compounds. Accordingly, it is an object of this invention to provide a co-oligomerization process which permits the production of partially known, but also of previously unknown cyclic and straight-chain olefinically unsaturated compounds from simple, commercially readily available starting materials without any difficulty with the use of carbon monoxide-free organometallic compounds of nickel.

The new type of reaction of the invention is most simply illustrated by the following comparison of a specific process described in the patents mentioned above with one possibility of co-oligomerization in accordance with the invention. Thus, it is described in Austrian Patent 219,580 that, for example, the action of butadiene on bis-cyclooctadiene-(1,5)-nickel-(0) results in substantially quantitative formation of cyclododecatri-(1,5,9)-ene. In accordance with the invention, this reaction may, for example, be directed such that if ethylene is also present high yields of trans, cis-cyclodecadi-(1,5)-ene and n-decatri(1,4,9)-ene which were unknown up to the present are obtained.

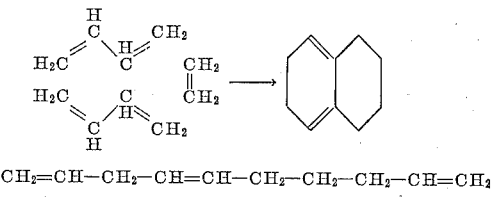

$CH_2=CH-CH_2-CH=CH-CH_2-CH_2-CH_2-CH=CH_2$

Thus, it is possible in accordance with the invention with the catalysts of Austrian Patent 219,580 and Belgian Patent 619,490 to combine 2 molecules of butadiene and 1 molecule of ethylene very smoothly to form both a ring system having 10 carbon atoms and n-decatri-(1,4,9)-ene. This is the more surprising since it was only with great difficulties that the 10-membered ring could be synthesized by known methods. This ring system could not be prepared thus far on a commercial scale. Further novel olefins are obtained if, for example, butadiene and butyne-(2) or butadiene and styrene are reacted in the presence of the catalysts mentioned above, 1,2-dimethyl cyclodecatri-(1,4,8)-ene being formed in the former case and 1-phenylcyclodecadi-(3,7)-ene in addition to 1-phenyl-n-decatri-(1,4,9)-ene in the latter case. All of the three compounds were unknown up to the present.

1,3-diolefins which may be used in the process of the invention are primarily isoprene, piperylene and especially butadiene. However, other 1,3-diolefins such as 3-methyl-heptatri-(1,4,6)-ene which is producible by the process of Austrian Patent 219,580 may also be used.

Unsaturated co-reactants which are used in accordance with the invention in the starting mixture to be oligomerized are ethylene, styrene and butyne-(2).

Suitable catalysts for the process of the invention are carbon monoxide-free complex compounds of nickel. These complex catalysts are prepared in a particularly advantageous manner by reacting the nickel compounds with organometallic compounds such as metal alkyls, metal aryls or Grignard's compounds or metal hydrides or complex metal hydrides in the presence of compounds which act as electron donors. Preferred are organometallic compounds or metal hydrides of groups I to III of the Periodic Table. The resultant mixtures may be used directly as catalysts. The isolated pure complex compounds of the transition metals may also be used with the same success.

Suitable electron donors are compounds which are capable of forming complex compounds with the transition metals. In the simplest case, the 1,3-diolefins necessary for the reaction are used themselves as electron donors. Furthermore, the olefins producible in the process may be used. Equally effective are generally unsaturated hydrocarbons containing carbon double bonds or carbon triple bonds such as, for example, cyclooctadi-(1,5)-ene, cyclododecatri-(1,5,9)-ene, stilbene or butyne-(2), tolane, phenyl acetylene, etc.

A further broad group of suitable electron donors is constituted by compounds which contain atoms with free electron pairs such as, for example, alkyl and aryl phosphines, alkyl and aryl phosphites and the corresponding compounds of arsenic and antimony.

While the electron donors containing C=C double bonds or C≡C triple bonds may be used in any great excess with respect to nickel, it is recommendable to use the electron donors of the second group mentioned above in molar ratios of nickel to donor of 1:1 to 1:8, in case of triphenyl phosphine even in molar ratios of 1:1 to 1:4, since the results are not improved or even impaired by higher mol ratios while the catalysts become uneconomic.

Nickel compounds which are readily soluble in the solvents used are particularly advantageous for the preparation of the catalysts. However, catalysts may also be obtained from compounds which are difficulty soluble in the solvents, but the formation of the catalysts from their components takes more time in these cases. For this reason, those nickel compounds in which the nickel is attached to organic radicals such as, for example, acetyl acetonate, acetoacetic ester enolates, alcoholates, salts of organic acids or dimethyl glyoxime compounds proved particularly advantageous in the process.

The process may be carried out in the presence of solvents. Suitable solvents are those which do not attack either the catalysts or the organometallic components or the metal hydrides. Aliphatic or aromatic hydrocarbons, aliphatic or cycloaliphatic ethers are such solvents. However, the olefins producible by the process are used with particular advantage as solvents already in the preparation of the catalyst thereby eliminating the necessity of separating other compounds from the reaction product.

The process may be carried out at atmospheric pressure or at superatmospheric pressures. The choice of the pressure range is largely determined by the direction the reaction is desired to take.

The process may be carried out at temperatures within the range between −10° C. and 200° C., preferred being temperatures between 30° and 100° C.

The compounds obtainable by the process of the invention are useful starting products for further syntheses. For example, cyclooctadiene may be used for the production of suberic acid, cyclodecadi-(1,5)-ene for the production of sebacic acid or of the corresponding 11-membered lactam, n-decatri-(1,4,9)-ene or its 1-phenyl derivative for the production of α-ω-difunctional compounds. Both the dicarboxylic acids and the lactams are useful monomers for the production of polyesters and polyamides, respectively.

The following examples are given by way of illustration and not limitation.

*Example 1*

To a mixture of 6.18 g.=24 millimols of nickel acetyl acetonate and 12.9 g.=24 millimols of tri-o-oxydiphenyl phosphite in 100 ml. of cyclooctadiene-(1,5) are added 6.3 g.=48 millimols of diethyl ethoxy aluminum at 20° C. There is formed a clear, orange-colored solution which is filled into a 2 liter autoclave equipped with an electromagnetic stirrer. Moreover, 100 g. of butadiene are placed into the autoclave into which ethylene is then introduced until a pressure of 60 atmospheres is reached. The autoclave is heated to 80° C. Further 350 g. of butadiene are injected within 1.5 hours. During the course of the reaction, the pressure drops to 45 atmospheres. The autoclave is allowed to cool and unconverted ethylene is vented. The reaction product is discharged. All volatile compounds are distilled in vacuo into a cooled receiver, the conditions at the end of the distillation being $10^{-4}$ mm. Hg and a bath temperature of 60° C. Substantially only the catalyst charged is left.

In addition to cyclooctadiene-(1,5) used as the solvent, the distillate contains 11.1 g.=2.3% of vinyl cyclohexene, 7 g.=1.4% of n-decatri-(1,4,9)-ene, 239 g.=48.5% of cyclooctadi-(1,5)-ene, 225 g.=45.7% of trans,cis-cyclodecadi-(1,5)-ene (B.P., 62.5° C./8 mm., $n_D^{20}=1.4960$), 5.3 g.=1.1% of all trans-cyclododecatri-(1,5,9)-ene. The yield of cyclic compounds is more than 97% of theory based on butadiene and ethylene converted. The residue contains 5 g. of higher polymers in addition to the catalyst.

*Example 2*

The catalyst is charged in the same manner as in Example 1 except that it is contained in 250 ml. of benzene. The procedure is the same as in Example 1 except that only 50 g. of butadiene are introduced into the autoclave and further portions of butadiene each of 50 g. are added every 15 minutes until a total of 580 g. is reached. The temperature is maintained at 75° C. and the pressure at 80–100 atmospheres. There are obtained 11 g.=1.7% of vinyl cyclohexene, 37.8%=5.8% of n-decatriene-(1,4,9), 269 g.=41.2% of cyclooctadiene-(1,5), 312 g.=47.8% of cyclodecadi-(1,5)-ene, 15 g.=2.3% of all trans-cyclododecatri-(1,5,9)-ene in addition to the benzene charged. Higher polymers in amount of 8 g.=1.2% are left in the distillation residue in addition to the catalyst.

*Example 3*

20 g. of bis-cyclooctadiene-(1,5)-nickel -(0) prepared by the process of the Belgian Patent 603,146, Example 1, are suspended in 300 ml. of cyclooctadiene. The suspension is mixed with 50 g. of butadiene. In doing so, the crystals go into solution. The solution is filled into a 5 liter autoclave and mixed with additional 1.65 kg. of butadiene. Ethylene is introduced until the pressure is 100–150 atmospheres and the autoclave is warmed to 30° C. During the reaction, the ethylene pressure is maintained at 110–150 atmospheres by supplying additional ethylene. After 16 hours, unconverted ethylene and butadiene are vented and the reaction product is processed in the manner described in Example 1. The resultant product comprises 5.8 g.=0.9% of vinyl cyclohexene, 120 g.=18.3% of n-decatri-(1,4,9)-ene, 5 g.=0.8% of cyclooctadiene-(1,5), 443 g.=67.5% of trans,cis-cyclodecadi-(1,5)-ene, 66.5 g.=10.1% of all trans-cyclododecatri-(1,5,9)-ene, 3.9 g.=0.6% of trans, trans,cis-cyclododecatri-(1,5,9)-ene, and 12.2 g.=1.9% of higher polymers.

*Example 4*

20.6 g.=80 mmoles of nickel acetyl acetonate are suspended in 300 ml. of cyclooctadi-(1,5)-ene and reacted with 20 g.=150 mmoles of diethyl-ethoxy aluminum at 0° C. The catalyst solution is mixed in a 5 liter autoclave with 100 g. of butadiene. Then ethylene is introduced under pressure until its pressure is 180–200 atmospheres and the autoclave is heated to 60° C. Further 100 g. of butadiene are injected every hour during the reaction, the total amount being 700 g. Processing in the manner described in Example 1 results in 8.5 g.=0.9% of vinyl-cyclohexene, 398 g.=43.8% of n-decatri-(1,4,9)-ene, 21 g.=2.3% of cyclooctadi-(1,5)-ene, 462 g.=50.9% of cyclodecadi-(1,5)-ene, 12.2 g.=1.3% of all trans-cyclododecatri-(1,5,9)-ene in addition to 5 g.=0.6% of higher polymers. The conversion of butadiene is 90%.

*Example 5*

The catalyst is prepared by the procedure of Example 1. Butadiene in amount of 230 g. is introduced into the catalyst solution at 60° C. and atmospheric pressure while stirring. At the same time, 90 g. of butyne-(2) are allowed to drop into the mixture (within 1 hour). Processing by the procedure of Example 1 results in 4 g.=1.4% of vinyl cyclohexene, 142 g.=49.1% of cyclooctadi-(1,5)-ene, 124.6 g.=43.1% of trans,cis,cis-4,2-dimethyl cyclodecatri-(1,4,8)-ene, 0.8 g.=0.3% of cyclododecatri-(1,5,9)-ene in addition to 17.7 g.=6.1% of higher polymers. The yield of cyclic olefins is 94% of theory based on butadiene and butyne-(2) converted. The conversion of butyne-(2) is 66%.

*Example 6*

4.35 g.=16 mmols of bis - cyclooctadiene - (1,5)-nickel-(0) are suspended in 170 g. of styrene. The suspension is saturated with butadiene at 30° C. and atmospheric pressure. The solution is kept saturated during the reaction (24 hrs.) by introducing additional butadiene. Processing by the procedure of Example 1 results in 1.4 g.=0.9% of vinyl cyclohexene, 5.5 g.=3.5% of cyclooctadi-(1,5)-ene, 19.7 g.=12.6% of cyclododecatri-(1,5,9) - ene, 6.7 g.=4.3% of 4 - phenyl - cyclodecadi-(1,7)-ene (B.P. 52–54° C./$10^{-4}$ mm. Hg), 114.3 g.=73.1% of 1 - phenyl - decatri - (1,4,9) - ene (B.P. 73–75° C./$10^{-4}$ mm. Hg) in addition to 9 g.=5.7% of higher polymers. The conversion of styrene is 75%.

*Example 7*

90 g. of nickel acetyl acetonate are reacted at 0° C. with 90 g. of diethyl monoethoxy aluminum in the presence of butadiene. This catalyst solution and 13 kgs. of butadiene are placed into a 50 liter autoclave and then ethylene is introduced until its pressure is 25 atmospheres. The mixture is allowed to stand for 3 weeks at 20° C. Then additional 10 kgs. of butadiene are introduced. After additional 5 weeks, the mixture is processed as described in Example 1 to give 116 g.=0.4% of vinyl cyclohexene, 2980 g.=10.5% of n - decatri - (1,4,9)-ene, 202 g.=0.7% of cyclooctadi-(1,5)-ene, 22,200 g.=78.2% of cis, trans - cyclodecadi - (1,5) - ene, 2115 g.=7.4% of cyclododecatri - (1,5,9) - ene, and 800 g. =2.8% of higher oligomers (75% thereof being distillable at 10⁻⁴ mm. Hg and 90–100° C.). The conversion of butadiene is 97% of the theoretical.

*Example 8*

A catalyst solution is prepared by the procedure of Example 7 from 54 gms. of nickel acetyl acetonate and 55 gms. of diethyl-monoethoxy aluminum and is then mixed with 1.9 kgs. of styrene and 1.8 kgs. of butadiene in an autoclave. The resultant mixture is pumped by means of an injection pump through a copper capillary of 100 m. in length and 5 mm. in inside diameter (free volumen, 2 liters) which is disposed in an oil bath heated at 80° C. The pumping rate is adjusted such that the residence time is about 1 hour. The reaction product is pressed out through a pressure release valve arranged at the end of the capillary and set at 30 atmospheres. Processing of the reaction product in the manner described in Example 1 results in 33 g.= 1.6% of vinyl cyclohexene, 29 g.=1.4% of cyclooctadi-(1,5)-ene, 22 g.=1.1% of a hydrocarbon of previously unknown constitution, 587 g.=28.6% of cyclododecatri-(1,5,9) - ene, 62.5 g.=3% of 1 - phenyl - cyclodecadi-(3,7) - ene, 1230 g.=59.9% of 1 - phenyl - n - decatri-(1,4,9)-ene and 90 g.=4.4% of higher oligomers. The conversion is 35% based on styrene.

*Example 9*

A solution of 5.6 g. of bis-cyclooctadiene nickel in 870 g. of isoprene is placed into a 2 liter autoclave and then ethylene is introduced under pressure until 100 atmospheres are reached. The autoclave is maintained at 45° C. for 25 hours. Processing in the manner described in Example 1 results in 13.7 g.=6.4% of p-diprene, 17.5 g.=8.2% of dipentene, 135 g.=63.3% of dimethyl decatri - (1,4,9) - ene, 29.7 g.=13.9% of dimethyl cyclooctadi - (1,5) - ene, 8.9 g.=4.2% of dimethyl cyclodecadi - (1,5) - ene and 8.3 g.=4% of higher oligomers.

*Example 10*

The catalyst is prepared by the procedure described in Example 1 except that 600 g. of isoprene are used as the solvent. The resultant solution is placed into an autoclave and then ethylene is introduced until its pressure is 200 atmospheres. The pressure drops from 200 to 77 atmospheres during the course of 35 hours at a reaction temperature of 60° C. Processing by the procedure of Example 1 results in 8.9 g.=1.4% of p-diprene and traces of dipentene, 134 g.=20.8% of dimethyl decatri - (1,4,9) - ene, 297 g.=46.2% of dimethyl cyclooctadi-(1,5) - ene, 200 g.=31.1% of dimethyl cyclodecadi-(1,5)-ene, and 4.1 g.=0.6% of higher oligomers.

*Example 11*

4.4 g. of nickel acetyl acetonate, 4.8 g. of triphenyl phosphine and 50 g. of butadiene are dissolved in 200 ml. of benzene. The solution is mixed with 4.5 g. of diethyl monoethoxy aluminum at 0° C. The resultant solution is placed into an autoclave. Then ethylene is introduced until its pressure is 70 atmospheres. At a reaction temperature of 60° C., 50 g. of butadiene are injected every 15 minutes, the total amount of butadiene so introduced being 350 g. Processing results in 28.3 g.=7.3% of vinyl cyclohexene, 34.8 g.=8.9% of n - decatri - (1,4,9) - ene, 61.8 g.=15.9% of cyclooctadi-(1,5)-ene, 248 g.=63.7% of cyclodecadi - (1,5,9) - ene, 14.7 g.=3.8% of cyclododecatri - (1,5,9) - ene, and 2 g.=0.5% of higher oligomers.

*Example 12*

5 g. of nickel acetyl acetonate, 6.0 g. of triphenyl phosphite and 30 g. of butadiene are dissolved in 110 ml. of benzene. The solution is mixed with 5.1 g. of diethylmonoethoxy aluminum at 0° C. This catalyst is used to carry out the reaction with ethylene by the procedure of Example 11. A total of 700 g. of butadiene is injected. There are obtained 12.7 g.=1.7% of vinyl cyclohexene, 24.5 g.=3.4% of n - decatri - (1,4,9) - ene, 179.3 g.= 24.5% of cyclooctadi - (1,5) - ene, 484 g.=66.3% of cis, trans - cyclodecadi - (1,5) - ene, 19.4 g.=2.6% of cyclododecatri - (1,5,9) - ene and 11 g.=1.5% of higher oligomers.

What is claimed is:

1. The process which comprises contacting (a) 1,3-diolefin and (b) a member selected from the group consisting of ethylene, butyne-(2) and styrene with an amount sufficient to catalyze the co-oligomerization reaction between said 1,3-diolefin and said group member of a carbon monoxide free organo-metallic complex compound of nickel, and recovering the co-oligomer thus produced.

2. The process according to claim 1, wherein said carbon-monoxide-free organo-metallic complex compound of nickel used as catalyst is obtained by reacting a compound of nickel with a member selected from the group consisting of organo-metallic compounds, Grignard compounds, metallic hydrides, and complex metal hydrides in the presence of an electron donor.

3. The process according to claim 2, wherein said carbon-monoxide gas-free organo-metallic complex compound of nickel is obtained by reacting a compound of nickel with a metal hydride of a group I to group III (periodic table) metal.

4. The process according to claim 2, wherein said electron donor is an unsaturated hydrocarbon.

5. The process according to claim 2, wherein said electron donor corresponds to the 1,3-diolefin reactant.

6. The process according to claim 2, wherein said electron donor is a compound containing atoms having free electron pairs selected from the group consisting of alkyl phosphines, aryl phosphines, alkyl phosphites, aryl phosphites and the corresponding compounds of arsenic and antimony.

7. The process according to claim 2, wherein said electron donor is triphenylphosphine and the molar ratio of nickel to phosphorus ranges between 1:1 and 1:4.

8. The process according to claim 1, wherein said 1,3-diolefin is a member selected from the group consisting of isoprene, piperylene, butadiene, and 3 - methyl - heptatri-(1,4,6)-ene.

9. The process according to claim 1, wherein said contacting is effected in the presence of an inert solvent.

10. The process according to claim 9, wherein said inert solvent is a member selected from the group consisting of aliphatic ethers, cycloaliphatic ethers, aliphatic hydrocarbons, and aromatic hydrocarbons.

11. The process according to claim 1, wherein said contacting is effected at atmospheric pressure.

12. The process according to claim 1, wherein said contacting is effected at an elevated pressure.

13. The process according to claim 1, wherein said contacting is effected at a temperature of from −10 to +200° C.

14. The process according to claim 13, wherein said contacting is effected at a temperature of from 30 to 100° C.

15. n - Decatri - (1,4,9) - ene having a boiling point of 97° C./86 mm. Hg and a refractive index, $n_D^{20}$, of 1.4480.

16. Cis,trans-cyclodecadiene - (1,5) having a boiling point of 62.5° C./8 mm. Hg and a refractive index, $n_D^{20}$, of 1.4960.

17. 1,2 - dimethyl cyclodecatri - (1,4,8) - ene having a boiling point of 32–33° C./0.05 mm. Hg and a refractive index, $n_D^{20}$, of 1.5098.

18. 1 - phenyl decatri - (1,4,9) - ene having a boiling point of 73–75° C./$10^{-4}$ mm. Hg and a refractive index, $n_D^{20}$, of 1.5420.

19. 1-phenylcyclodecadi-(3,7)-ene.

References Cited by the Examiner

Moore et al., American Chemical Society Journal, 85, 86–89, January 5, 1963.

Moore et al., Journal of Organic Chemistry, 27, 4186 (1962).

Sondheimer et al., American Chemical Society Journal, 84, 3520–3526, September 20, 1962.

Zakharkin et al., Izv. Akad. Nauk, S.S.S.R., Otd. Khim Nauk, 1963, 386; abstracted in Chemical Abstracts, 58, 13810.

DELBERT E. GANTZ, *Primary Examiner.*

ALPHONSO D. SULLIVAN, *Examiner.*

C. R. DAVIS, *Assistant Examiner.*